United States Patent
Yazawa

(10) Patent No.: US 12,270,716 B2
(45) Date of Patent: Apr. 8, 2025

(54) SENSOR DEVICE

(71) Applicant: KOA CORPORATION, Nagano (JP)

(72) Inventor: Miki Yazawa, Nagano (JP)

(73) Assignee: KOA CORPORATION, Nagano (JP)

( * ) Notice: Subject to any disclaimer, the term of this patent is extended or adjusted under 35 U.S.C. 154(b) by 467 days.

(21) Appl. No.: 17/698,459

(22) Filed: Mar. 18, 2022

(65) Prior Publication Data

US 2022/0307918 A1    Sep. 29, 2022

(30) Foreign Application Priority Data

Mar. 24, 2021    (JP) .................. 2021-049692

(51) Int. Cl.
| | | |
|---|---|---|
| *G01K 7/24* | (2006.01) | |
| *G01K 1/08* | (2021.01) | |
| *H01C 1/022* | (2006.01) | |
| *H01C 7/02* | (2006.01) | |

(52) U.S. Cl.
CPC ................. *G01K 7/24* (2013.01); *G01K 1/08* (2013.01); *H01C 1/022* (2013.01); *H01C 7/021* (2013.01)

(58) Field of Classification Search
CPC .......... H01C 1/022; H01C 7/021; G01K 7/24; G01K 1/08
See application file for complete search history.

(56) References Cited

U.S. PATENT DOCUMENTS

| | | | | |
|---|---|---|---|---|
| 6,762,671 B2* | 7/2004 | Nelson | .................. | G01K 7/223 |
| | | | | 374/185 |
| 7,121,722 B2* | 10/2006 | Hanzawa | ............... | G01K 13/02 |
| | | | | 374/185 |
| 7,802,472 B1* | 9/2010 | Richer | ................. | G01D 11/245 |
| | | | | 73/431 |

FOREIGN PATENT DOCUMENTS

| | | | | |
|---|---|---|---|---|
| EP | 3667250 A1 * | 6/2020 | ........... | G01D 11/245 |
| JP | 7-229914 | 8/1995 | | |
| JP | 10-239169 | 9/1998 | | |
| JP | 2019-215163 | 12/2019 | | |

OTHER PUBLICATIONS

EP3667250 machine translation (Year: 2020).*
JPH10239169 machine translation (Year: 1998).*

* cited by examiner

*Primary Examiner* — Kyung S Lee
(74) *Attorney, Agent, or Firm* — Greenblum & Bernstein, P.L.C.

(57) ABSTRACT

A sensor device according to the present invention includes: a sensor element including a temperature-sensitive resistor; and a protective cover that protects the sensor element, wherein the sensor element has a shape extending long along one direction, and the protective cover surrounds a periphery of the sensor element with a plurality of support pillars extending obliquely with respect to a longitudinal direction of the sensor element. It is preferable that the plurality of support pillars intersect in a lattice-like manner.

8 Claims, 13 Drawing Sheets

SENSOR DEVICE

BACKGROUND OF THE INVENTION

1. Technical Field

The present invention relates to a sensor device capable of measuring a wind speed, for example.

2. Description of the Related Art

A thermal sensor device is known that exposes a heated resistance element for flow sensing to a fluid and senses the flow of the fluid based on heat radiation at that time. The sensor device includes a resistance element for temperature compensation in addition to the resistance element for flow sensing, and the resistance element for flow sensing and the resistance element for temperature compensation are incorporated in a bridge circuit. When the resistance element for flow sensing receives a fluid, the temperature of the resistance element for flow sensing decreases and the resistance thereof changes, whereby a differential output can be obtained in the bridge circuit. Based on this differential output, the flow of the fluid can be sensed.

According to JP 2019-215163 A, for example, sensor elements each including a resistance element for flow sensing and a resistance element for temperature compensation are supported by an insulating substrate via lead wires, respectively, while being spaced apart from the insulating substrate.

SUMMARY OF THE INVENTION

Meanwhile, in a sensor device disclosed in JP 2019-215163 A, the sensor elements are not provided with a protective cover for protecting the sensor elements from external contact, and thus are exposed to the outside.

Then, a configuration in which a protective cover is placed around the sensor elements is thought of. However, depending on a flow direction of a fluid, there is caused a problem of reduction of sensing accuracy under the influence of the protective cover before the fluid reaches the sensor elements.

Further, the configuration of the sensor device disclosed in JP 2019-215163 A is originally intended to improve the accuracy in sensing the flow from a specific direction, and not intended to obtain omni-directionality of the sensor elements to the surroundings at 360 degrees.

JP H10-239169 A discloses a temperature sensor including a temperature sensor element covered with a cap. However, it is neither intended to be applied to flow sensing, nor expected to have a configuration in consideration of omni-directionality of the temperature sensor element to its surroundings at 360 degrees.

In view of the above-described problems, the present invention has been made, and an object thereof is to provide a sensor device that can protect a sensor element from the outside and improve omni-directionality of the sensor element to its surroundings at 360 degrees.

A sensor device according to the present invention includes: a sensor element including a temperature-sensitive resistor; and a protective cover that protects the sensor element, wherein the sensor element has a shape extending long along one direction, and the protective cover surrounds a periphery of the sensor element with a plurality of support pillars extending obliquely with respect to a longitudinal direction of the sensor element.

Further, a sensor device according to the present invention includes: a sensor element including a temperature-sensitive resistor; and a protective cover that protects the sensor element, wherein the sensor element is supported by a substrate, the temperature-sensitive resistor is formed along an entire circumferential direction of the sensor element, and the protective cover surrounds a periphery of the sensor element with a plurality of support pillars extending obliquely with respect to a direction in which the sensor element is placed as viewed from the substrate.

The sensor device according to the present invention can protect the sensor element from the outside and improve omni-directionality of the sensor element to its surroundings at 360 degrees.

DETAILED DESCRIPTION

Below, an embodiment of the present invention (hereinafter simply referred to as an "embodiment") will be described in detail. The present invention is not limited to the following embodiment, and can be subjected to various modifications for implementation within the scope of the gist thereof.

Description of Sensor Device According to First Embodiment

Figure 1:
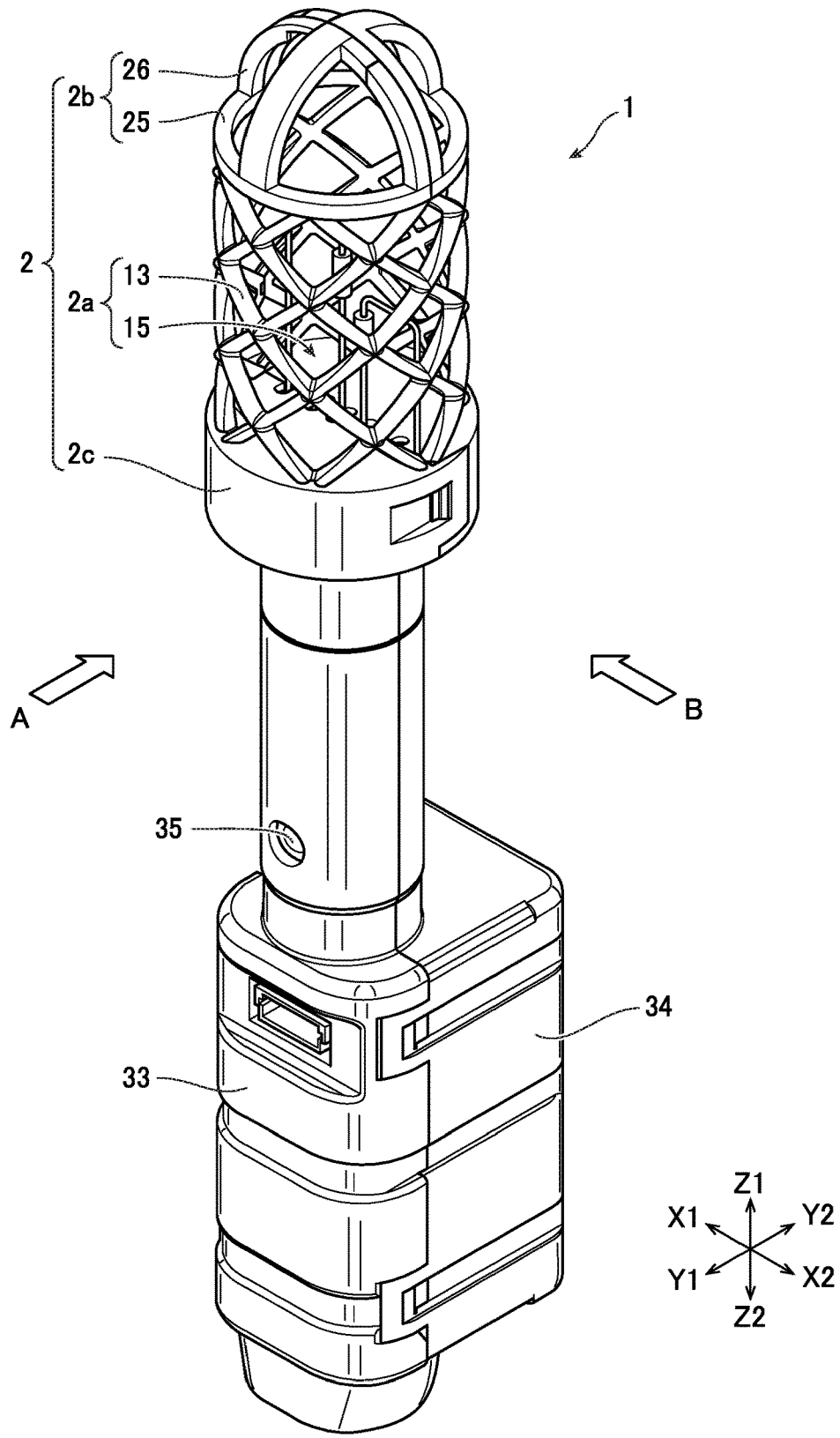
FIG. 1 is a perspective view of a sensor device according to a first embodiment.
Figure 2:
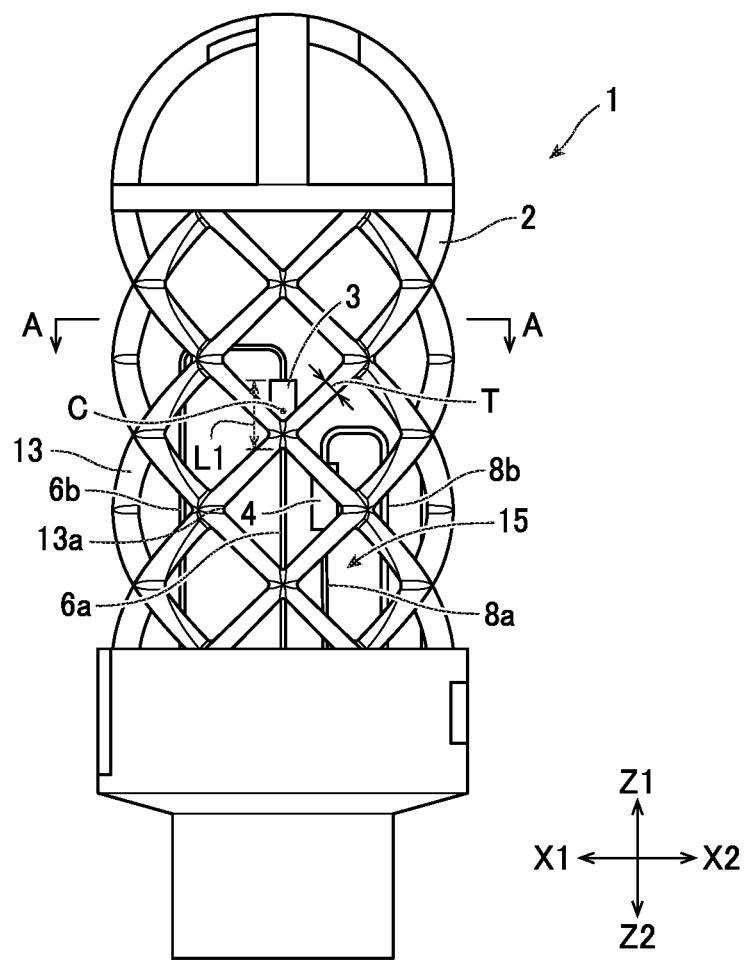
FIG. 2 is a front view of the sensor device according to the first embodiment.
Figure 3:
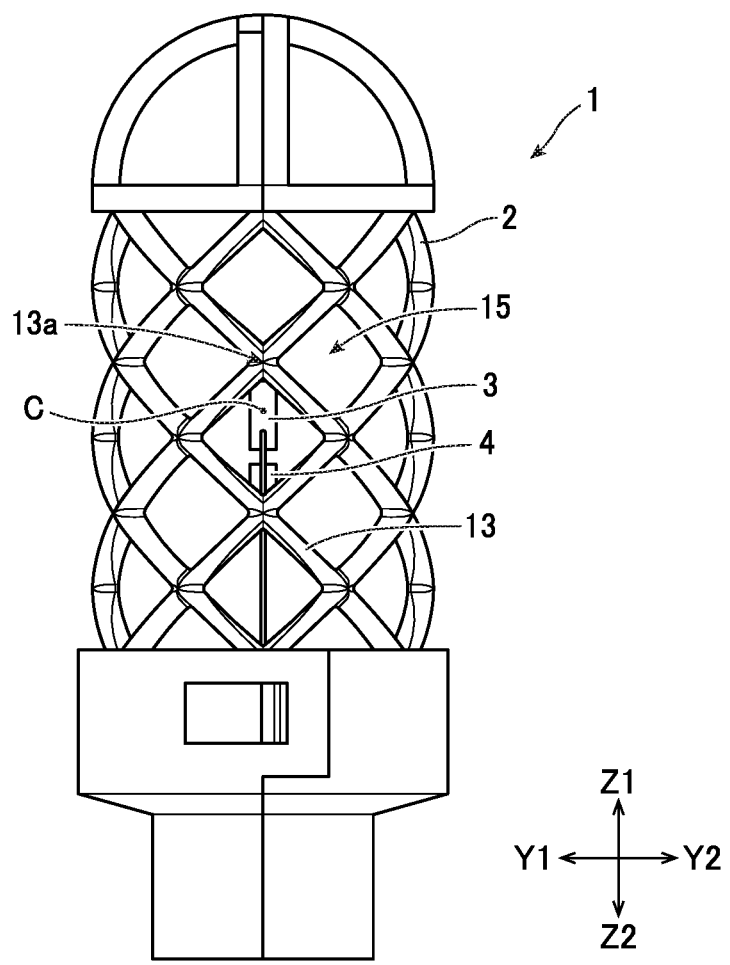
FIG. 3 is a side view of the sensor device according to the first embodiment.
Figure 4:
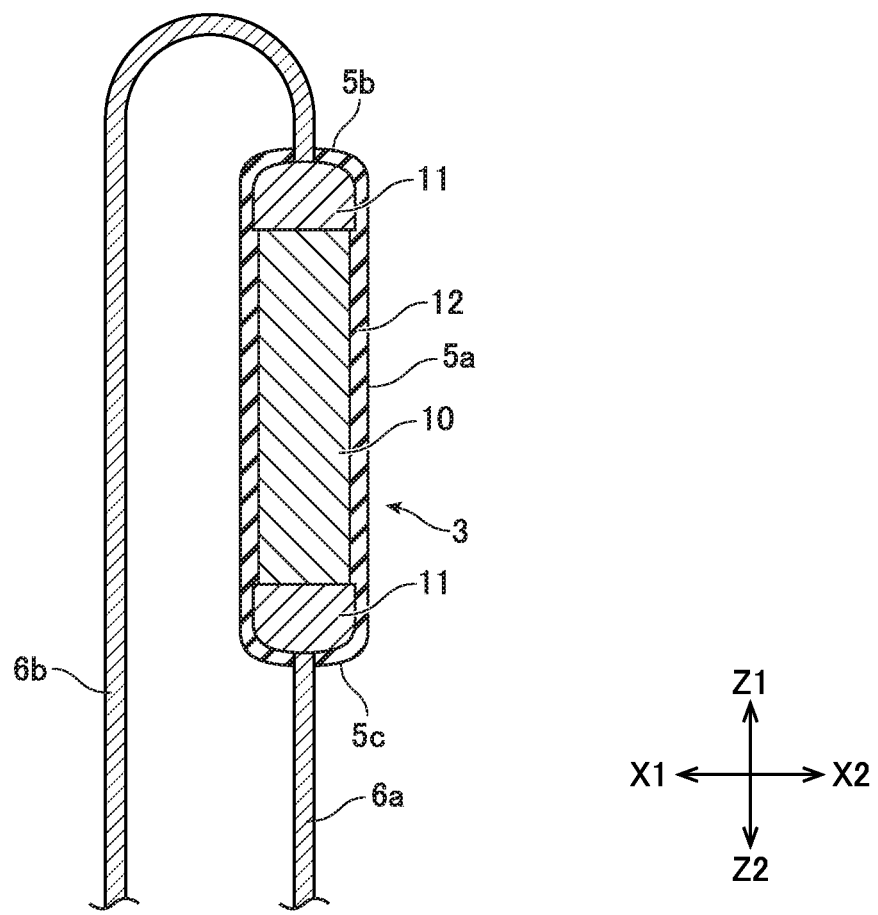
FIG. 4 is a sectional view of a sensor element according to the present embodiment.
Figure 5:
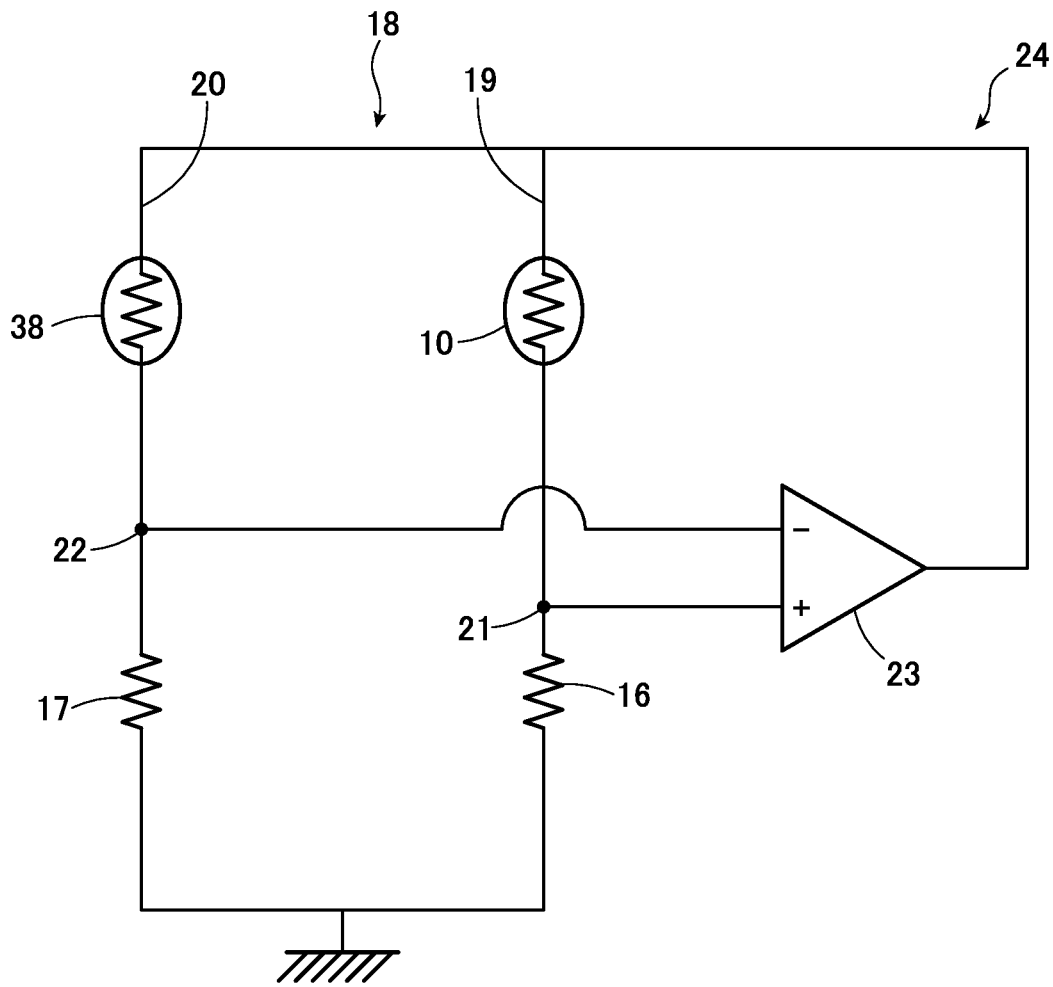
FIG. 5 is a circuit diagram of the sensor device according to the present embodiment.
Figure 6:
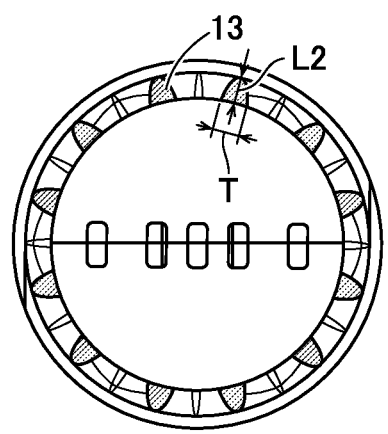
FIG. 6 is a sectional view of a protective cover illustrated in FIG. 2, taken along a line A-A.

FIG. 1 is a perspective view of a sensor device according to a first embodiment. FIG. 2 is a front view of the sensor device according to the first embodiment. FIG. 3 is a side view of the sensor device according to the first embodiment. FIG. 4 is a sectional view of a sensor element according to the present embodiment. FIG. 5 is a circuit diagram of the sensor device according to the present embodiment. FIG. 6 is a sectional view of a protective cover illustrated in FIG. 2, taken along a line A-A.

(Outline of Sensor Device 1)

An X1-X2 direction and a Y1-Y2 direction illustrated in FIG. 1 indicate two directions perpendicular to each other in a plane, and a Z1-Z2 direction illustrated in FIG. 1 indicates a height direction perpendicular to the X1-X2 direction and the Y1-Y2 direction.

A sensor device 1 according to the first embodiment illustrated in FIG. 1 includes sensor elements 3 and 4 each including a temperature-sensitive resistor, and a protective cover 2 that protects the sensor elements 3 and 4 from the outside.

Hereinafter, in the first embodiment and other embodiments described later, the above-described plane and height direction are defined based on the posture of the sensor device 1 illustrated in FIG. 1. That is, the following description will be made based on the premise that a state in which the sensor device 1 stands upright in such a manner that the protective cover 2 is positioned above the sensor device 1 is a basic posture.

As illustrated in FIGS. 1 to 3, the sensor elements 3 and 4 are placed inside the protective cover 2 having a mesh structure.

As illustrated in FIGS. 1 to 3, the sensor elements 3 and 4 are each formed in a shape extending long along the height direction (Z1-Z2 direction). Thus, the sensor elements 3 and 4 are rod-shaped, and specifically, may have a shape of a column or a polygonal prism. Here, the sensor elements 3 and 4 in the present embodiment each have a columnar shape extending long along the height direction.

Figure 7:
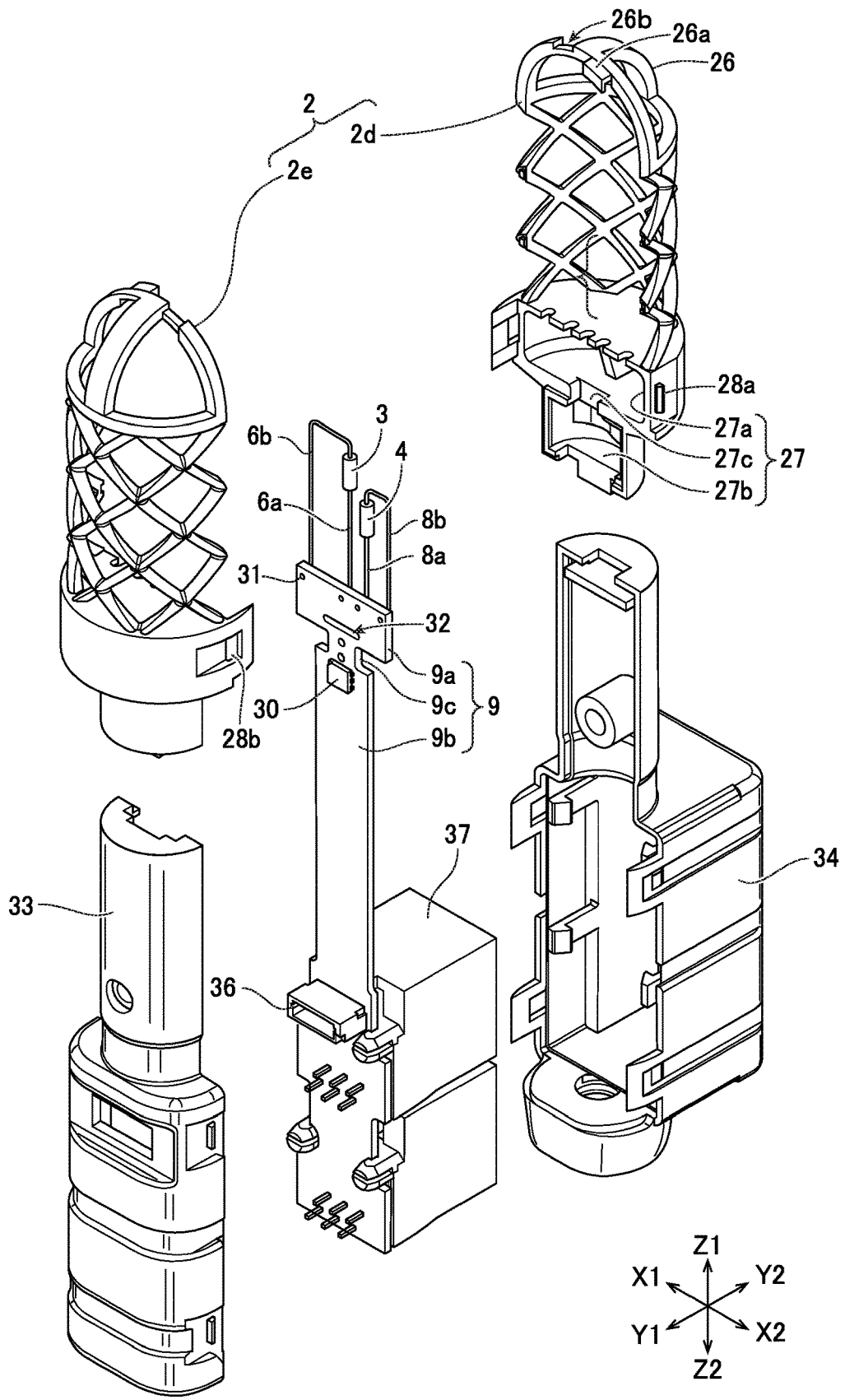
FIG. 7 is an exploded perspective view of the sensor device illustrated in FIG. 1.

As illustrated in FIG. 2, each of the sensor elements 3 and 4 has both ends connected to lead wires 6a, 6b, 8a, and 8b, and each lead wire is connected to a substrate 9 (see FIG. 7).

The sensor element 3 is a first sensor element including a flow sensing resistor 10, and the sensor element 4 is a second sensor element including a temperature compensation resistor 38.

The internal structure of the first sensor element 3 will be described with reference to FIG. 4. As illustrated in FIG. 4, the first sensor element 3 includes the flow sensing resistor 10 as a temperature-sensitive resistor, electrode caps 11 placed on both sides of the flow sensing resistor 10, and an insulating film 12 covering the flow sensing resistor 10 and the electrode caps 11.

The flow sensing resistor 10 is formed of a columnar substrate such as ceramic, that has a resistance coating film formed on the surface thereof, for example. Thus, the flow sensing resistor (temperature-sensitive resistor) 10 is formed so as to extend along an entire circumferential direction. Here, the terms "entire circumferential direction" mean a direction around an axis having its center on the height direction (Z1-Z2 direction) along which the first sensor element 3 extends. Additionally, though not illustrated, the surface of the resistance coating film of the flow sensing resistor 10 is trimmed to adjust the resistance.

The outer surface of the first sensor element 3 includes an element surface 5a functioning as a flow sensing surface, and an upper surface 5b and a lower surface 5c positioned above and below the element surface 5a.

As illustrated in FIG. 4, a first lead wire 6a extends in the Z2 direction from one of the electrode caps 11 positioned closer to the lower surface 5c. Further, a first lead wire 6b extends in the Z1 direction from the other electrode cap 11 positioned closer to the upper surface 5b, is bent at some midpoint, and then extends in the Z2 direction. Thus, as illustrated in FIG. 4, the pair of lead wires 6a and 6b face each other with a predetermined spacing along the X1-X2 direction, and both extend in the Z2 direction. Then, the ends of the pair of lead wires 6a and 6b are connected to the substrate 9.

The second sensor element 4 has a structure similar to that in FIG. 4, but incorporates therein a temperature compensation resistor 38 as a temperature-sensitive resistor, in place of the flow sensing resistor 10.

As illustrated in FIG. 5, the flow sensing resistor 10, together with the temperature compensation resistor 38, forms a bridge circuit. As illustrated in FIG. 5, the flow sensing resistor 10, the temperature compensation resistor 38, and resistors 16 and 17 form a bridge circuit 18. As illustrated in FIG. 5, the flow sensing resistor 10 and the resistor 16 form a first series circuit 19, and the temperature compensation resistor 38 and the resistor 17 form a second series circuit 20. Then, the first series circuit 19 and the second series circuit 20 are connected in parallel, thereby forming the bridge circuit 18.

As illustrated in FIG. 5, an output unit 21 of the first series circuit 19 and an output unit 22 of the second series circuit 20 are each connected to a differential amplifier (amp) 23. The bridge circuit 18 is connected to a feedback circuit 24 including the differential amplifier 23. The feedback circuit 24 includes a transistor (not illustrated) and the like.

The resistors 16 and 17 each have a temperature coefficient of resistance (TCR) lower than that of each of the flow sensing resistor 10 and the temperature compensation resistor 38. The flow sensing resistor 10 has a predetermined resistance value Rs1 while in a heated state controlled such that its temperature is higher than a predetermined ambient temperature by a predetermined value, for example. The temperature compensation resistor 38 is controlled such that it has a predetermined resistance value Rs2 at the ambient temperature, for example. In this regard, the resistance value Rs1 is lower than the resistance value Rs2. The resistor 16 forming the first series circuit 19, together with the flow sensing resistor 10, is a fixed resistor having a resistance value R1 similar to the resistance value Rs1 of the flow sensing resistor 10, for example. On the other hand, the resistor 17 forming the second series circuit 20, together with the temperature compensation resistor 38, is a fixed resistor having a resistance value R2 similar to the resistance value Rs2 of the temperature compensation resistor 38, for example.

As the flow sensing resistor 10 is adjusted so as to have a temperature higher than the ambient temperature, the temperature of the flow sensing resistor 10 serving as a heating resistor decreases when the first sensor element 3 faces wind. This causes variation in the potential of the output unit 21 of the first series circuit 19 connected to the flow sensing resistor 10. As a result of this, a differential output is obtained by the differential amplifier 23. Then, in accordance with the differential output, the feedback circuit 24 applies a driving voltage onto the flow sensing resistor 10. Thereafter, in accordance with a change in a voltage required for heating the flow sensing resistor 10, a microcomputer 30 (refer to FIG. 7) placed in the substrate 9 performs conversion into a wind speed, to output it. Additionally, the microcomputer is electrically connected to the sensor elements 3 and 4 via the lead wires 6a, 6b, 8a, and 8b.

Further, the temperature compensation resistor 38 senses the temperature of a fluid itself and compensates for the influence of a temperature change of the fluid. Thus, by including the temperature compensation resistor 38, it is possible to reduce the influence of a temperature change of the fluid upon flow sensing, which enables accurate flow sensing. As described above, the temperature compensation resistor 38 has resistance much higher than that of the flow sensing resistor 10, and the temperature thereof is set to approximately the ambient temperature. Hence, when the temperature compensation resistor 38 faces wind, there is little change in the potential of the output unit 22 of the second series circuit 20 connected to the temperature compensation resistor 38. Therefore, it is possible to accurately obtain a differential output in accordance with a change in the resistance of the flow sensing resistor 10 while using the potential of the output unit 22 as a reference potential.

Additionally, the circuit configuration illustrated in FIG. 5 is a mere example, and the present embodiment is not limited thereto.

(Protective Cover 2)

As illustrated in FIG. 1, the protective cover 2 includes a peripheral unit 2a surrounding the peripheries of the sensor elements 3 and 4, a ceiling unit 2b positioned above (on the Z1 side of) the peripheral unit 2a, and a fixing support unit 2c positioned below (on the Z2 side of) the peripheral unit 2a.

The peripheral unit 2a of the protective cover 2 surrounds the peripheries of the sensor elements 3 and 4 with a plurality of support pillars 13 extending obliquely with respect to the longitudinal direction of the sensor elements 3 and 4 (Z1-Z2 direction), and includes a plurality of through holes 15. In the first embodiment, the plurality of support pillars 13 intersect in a lattice-like manner.

Each of the support pillars 13 is inclined from the fixing support unit 2c toward the ceiling unit 2b while being twisted, to connect the ceiling unit 2b and the fixing support unit 2c. The support pillars 13 are formed of two inclination patterns of support pillars extending in respective inclination directions different from each other by about 90 degrees, and the support pillars 13 in the respective patterns extend obliquely and intersect in a lattice-like manner.

In the peripheral unit 2a, portions other than the support pillars 13 are the through holes 15, and the shape (contour) of each through hole 15 is a rhombus or a rectangle. Then, the sensor elements 3 and 4 positioned inside the protective cover 2 can be viewed from the outside through the through holes 15. FIG. 2 is a front view as viewed from a direction of an arrow A illustrated in FIG. 1, and FIG. 3 is a side view as viewed from a direction of an arrow B illustrated in FIG. 1. In each of the drawings, the sensor elements 3 and 4 appear through the through holes 15. Further, the sensor elements 3 and 4 appear through the through holes 15 also when viewed from an angle other than those in FIGS. 2 and 3. This is because the support pillars 13 forming the protective cover 2 extend obliquely with respect to the longitudinal direction of the sensor elements 3 and 4 (Z1-Z2 direction).

Thus, when wind acts on the sensor elements 3 and 4 from the directions of the surroundings at 360 degrees, in other words, when wind acts from the directions of the surroundings at 360 degrees in a horizontal plane including the X1-X2 direction and the Y1-Y2 direction, the wind from any direction passes through the through holes 15 of the peripheral unit 2a, to act on the first sensor element 3 including the flow sensing resistor 10. Therefore, the first sensor element 3 can achieve flow sensing upon the action of wind from the surroundings at 360 degrees therearound. With the above-described configuration, the sensor device 1 according to the first embodiment can appropriately protect the sensor elements 3 and 4 from the outside and improve the omni-directionality of the sensor elements 3 and 4 to the surroundings at 360 degrees.

In the first embodiment, the plurality of support pillars 13 intersect in a lattice-like manner. This can increase the strength of the protective cover 2.

Furthermore, it is preferable to have the following configurations.

(1) Deviation of intersections 13a where the plurality of support pillars 13 intersect, from a center C of the first sensor element 3 in a side view at each of all angles to the circumferential direction (refer to FIGS. 2 and 3).

As illustrated in the front view and the side view of FIGS. 2 and 3, the intersections 13a deviate upward (toward the Z1 side) or downward (toward the Z2 side) from the center C of the first sensor element 3. The same applies to ambient angles other than those in FIGS. 2 and 3. Thus, wind can be caused to properly act on the first sensor element 3 from any of the directions of the surroundings at 360 degrees, whereby the omni-directionality to the surroundings at 360 degrees can be effectively improved.

(2) A width T of each of the support pillars 13, smaller than a length L1 of the first sensor element 3 along the longitudinal direction (Z1-Z2 direction) (refer to FIG. 2 and FIG. 8 described later).

Reducing the width T of each support pillar 13 as described above can reduce an area in which the first sensor element 3 and the support pillars 13 overlap each other in a side view, thereby effectively improving the omni-directionality. In the present embodiment, the overlapping area of the support pillars 13 with respect to the first sensor element 3 is preferably 75% or less, more preferably 65% or less, much more preferably 60% or less, still much more preferably 55% or less, and most preferably 50% or less, in a side view at any ambient angle.

(3) A length (thickness) L2 from the outside to the inside of each support pillar 13, larger than the width T of each support pillar 13 (refer to FIG. 6).

Here, the terms "the inside of each support pillar 13" mean the inner side of the protective cover 2 in which the sensor elements 3 and 4 are placed, and the terms "the outside of the support pillars 13" mean the opposite side (the outer side of the protective cover 2).

FIG. 6 is a sectional view taken along a line A-A in FIG. 2. As illustrated in FIG. 6, the length L2 of each support pillar 13 is larger than the width T. As a result, wind blowing from the outer side of the protective cover 2 toward the inner side of the protective cover 2 is less likely to be blocked by the support pillars 13. In other words, the range of directions of wind blowing directly against the support pillars 13 can be reduced. This can effectively improve the omni-directionality to the surroundings at 360 degrees.

Additionally, in a configuration in which the width T changes with the position from the outside to the inside of the support pillars 13 as illustrated in FIG. 6, the maximum width and the length (thickness) L2 of each support pillar 13 are compared.

(4) Formation of the support pillar 13 having a protrusion-shaped section with a width gradually decreasing from the inside to the outside (refer to FIG. 6).

Because of the protrusion-shaped section with an outwardly protruding portion as illustrated in FIG. 6, wind is allowed to smoothly pass through the side surface of each support pillar 13 from the outside to the inside, whereby the omni-directionality to the surroundings at 360 degrees can be effectively improved.

The ceiling unit 2b positioned above the peripheral unit 2a will be described. As illustrated in FIG. 1, the ceiling unit 2b has a structure provided with a ring unit 25 connecting the support pillars 13 forming the peripheral unit 2a, and with two arch-shaped supports 26 intersecting above the ring unit 25, though the present embodiment is not limited to this structure. However, including the ceiling unit 2b can increase the strength of the protective cover 2. Including the supports 26 can encourage improvement in the strength of the protective cover 2. In this regard, by placing the pillar-shaped supports 26 rather than covering the whole of the ceiling unit 2b, it is possible to produce a space communicating with the inside of the protective cover 2 in a position other than the supports 26. This can be considered to reduce the influence of airflow provided obliquely from above, upon the sensing accuracy to the surroundings at 360 degrees.

The fixing support unit 2c will be described. With regard to the description of the fixing support unit 2c, the structure inside the fixing support unit 2c is important, and thus FIGS. 7 and 8 will be referred to below.

FIG. 7 is an exploded perspective view of the sensor device illustrated in FIG. 1. FIG. 8 is a partial enlarged front view illustrating a part of FIG. 7 that is enlarged.

As illustrated in FIG. 7, the protective cover 2 can be divided into a first part 2d and a second part 2e, and these parts 2d and 2e are combined to form the protective cover 2 surrounding the peripheries of the sensor elements 3 and 4. The parts 2d and 2e have the same shape and are resin-molded using a mold.

Figure 8:
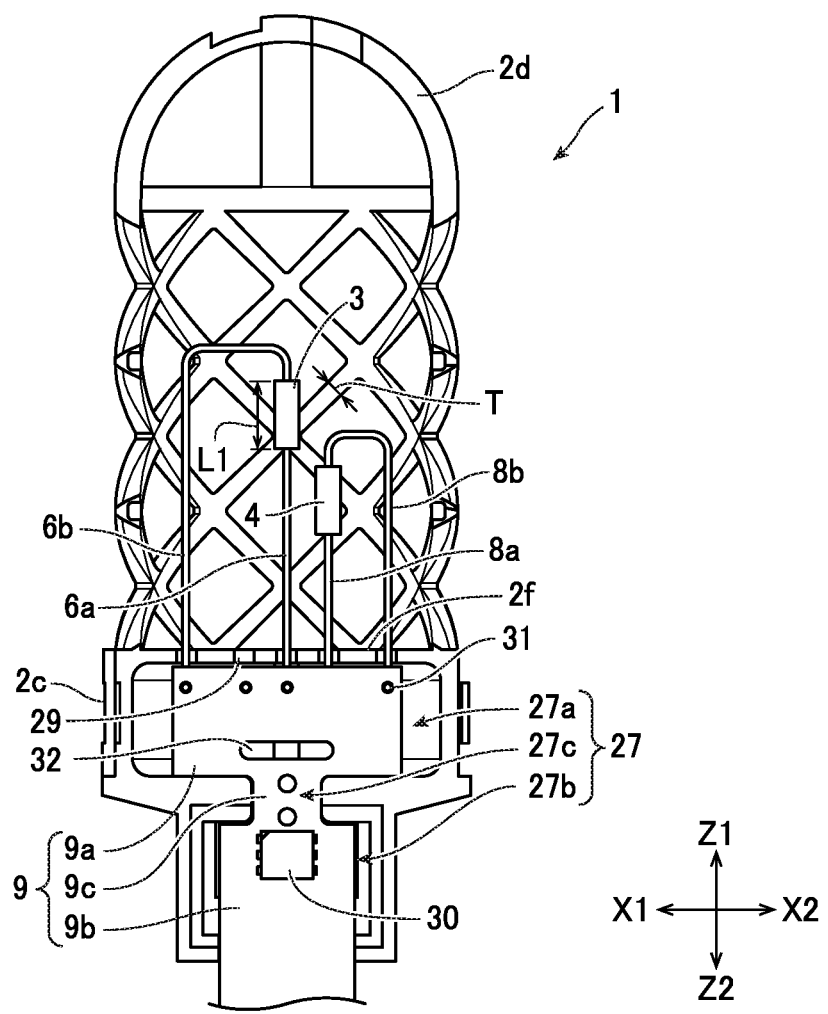
FIG. 8 is a partial enlarged front view illustrating a part of FIG. 7 that is enlarged.

As illustrated in FIGS. 7 and 8, the first part 2d has a recessed storage unit 27 inside the fixing support unit 2c. The storage unit 27 is divided into a first storage 27a, a second storage 27b, and a third storage 27c that communicate with each other.

The substrate 9 connected to the sensor elements 3 and 4 can be stored in the respective storages 27a to 27c of the fixing support unit 2c. Also in the second part 2e, the storage unit 27 similar to that in the first part 2d is formed. By combining the parts 2d and 2e, it is possible to reliably fix and support the substrate 9 in the fixing support unit 2c.

Further, as illustrated in FIGS. 7 and 8, a plurality of small holes 29 are provided in the upper surface of the fixing support unit 2c, and the small holes 29 communicate with the storage unit 27. Thus, as illustrated in FIG. 8, the lead wires 6a, 6b, 8a, and 8b that fix the sensor elements 3 and 4 can be passed through the small holes 29. As a result of this, the substrate 9 can be stored in the fixing support unit 2c, and the sensor elements 3 and 4 can be placed above (on the Z1 side of), and apart from, the upper surface of the fixing support unit 2c.

As illustrated in FIG. 7, in each of the supports 26 provided in the ceiling unit 2b of the protective cover 2, a hook 26a and a recess-shaped hook catch 26b are formed. Further, the fixing support unit 2c is provided with a fitting protrusion 28a and a fitting hole 28b positioned on the opposite side of the fitting protrusion 28a. Thus, when the parts 2d and 2e are combined, the hook 26a of the ceiling unit 2b is inserted into the hook catch 26b, and further, the fitting protrusion 28a is fitted into the fitting hole 28b. This can join the parts 2d and 2e and also can prevent the pair of parts 2d and 2e from being detached in spite of an external impact or the like, thereby appropriately encouraging protection of the sensor elements 3 and 4.

(Sensor Elements 3 and 4)

Supplemental description of the sensor elements 3 and 4 will be given. As illustrated in FIG. 8, the first sensor element 3 is preferably placed in a position higher than the second sensor element 4. That is, the first sensor element 3 is preferably placed farther from the upper surface 2f of the fixing support unit 2c than the second sensor element 4. More preferably, the first sensor element 3 is formed in a position higher than the lead wire 8b connected to the second sensor element 4. As a result, while wind is acting on the first sensor element 3, the influence of the second sensor element 4 and the lead wire 8b can be reduced, thereby effectively improving the omni-directionality to the surroundings at 360 degrees.

Further, it is preferable to arrange the sensor elements 3 and 4 and the lead wires 6a, 6b, 8a, and 8b in a row. As a result, when viewed from the first sensor element 3, the second sensor element 4 and the lead wires are arranged only along one direction (the X1-X2 direction as illustrated in FIG. 7). While wind is acting on the first sensor element 3, the range of angles at which the second sensor element 4 and the lead wire 8b affect can be minimized, whereby the omni-directionality to the surroundings at 360 degrees can be effectively improved.

Moreover, the first sensor element 3 is preferably positioned substantially at the center of the upper surface 2f of the fixing support unit 2c. In other words, the first sensor element 3 is preferably placed in a position at a substantially equal distance from each portion of the peripheral unit 2a of the protective cover 2. As a result, while wind is acting from the surroundings at 360 degrees, the wind can more easily center around the first sensor element 3 to act on it, whereby the omni-directionality to the surroundings at 360 degrees can be effectively improved.

(Substrate 9)

The substrate 9 that supports the sensor elements 3 and 4 will be described. The substrate 9 is an insulating substrate, and, though not limited to a particular substrate, is preferably a general printed substrate in which glass-fiber cloth is impregnated with an epoxy resin. An FR4 substrate can be proposed, for example.

As illustrated in FIGS. 7 and 8, the substrate 9 includes a sensor 9a that supports the sensor elements 3 and 4, a drive board 9b on which the microcomputer 30, connectors 36 and 37, and the like are installed, and a coupling portion 9c that couples the sensor 9a and the drive board 9b.

The first storage 27a formed in the fixing support unit 2c of the protective cover 2 is formed in a size capable of storing therein the sensor 9a, the second storage 27b is formed in a size capable of storing therein the drive board 9b, and the third storage 27c is formed in a size capable of storing therein the coupling portion 9c.

As illustrated in FIGS. 7 and 8, a plurality of holes 31 are formed in a row in the sensor 9a, and the lead wires 6a, 6b, 8a, and 8b connected to the sensor elements 3 and 4 are inserted into the holes 31, respectively, and fixed.

As illustrated in FIGS. 7 and 8, the width of the coupling portion 9c is smaller than the width of the sensor 9a and the drive board 9b. Thus, heat generated in the drive board 9b is less likely to be transferred to the sensor 9a and the sensor elements 3 and 4. As a result, excellent sensing accuracy can be maintained. Further, a slit 32 is formed in the sensor 9a near the coupling portion 9c, to separate the heat sources of the sensor 9a and the drive board 9b. With this configuration, the thermal influence of the drive board 9b upon the sensor 9a can be reduced, and the sensor responsiveness can be improved.

(Assembly of Sensor Device)

In the first embodiment, the substrate 9 including the sensor elements 3 and 4 is stored in the storage unit 27 in the pair of parts 2d and 2e forming the protective cover 2 illustrated in FIG. 7, and the parts 2d and 2e are combined and joined. Subsequently, a pair of cases 33 and 34 are combined in the lower end of the protective cover 2 so as to cover the drive board 9b, and are fastened with a screw 35. Then, the sensor device 1 illustrated in FIG. 1 is completed.

Description of Sensor Device According to Second Embodiment

Below, sensor devices other than the first embodiment will be described. However, since the main body of the device (including the sensor elements 3 and 4, the substrate 9, and the cases 33 and 34) except the protective cover has a structure similar to that in the first embodiment, only a protective cover will be described in the following embodiments.

Figure 9:
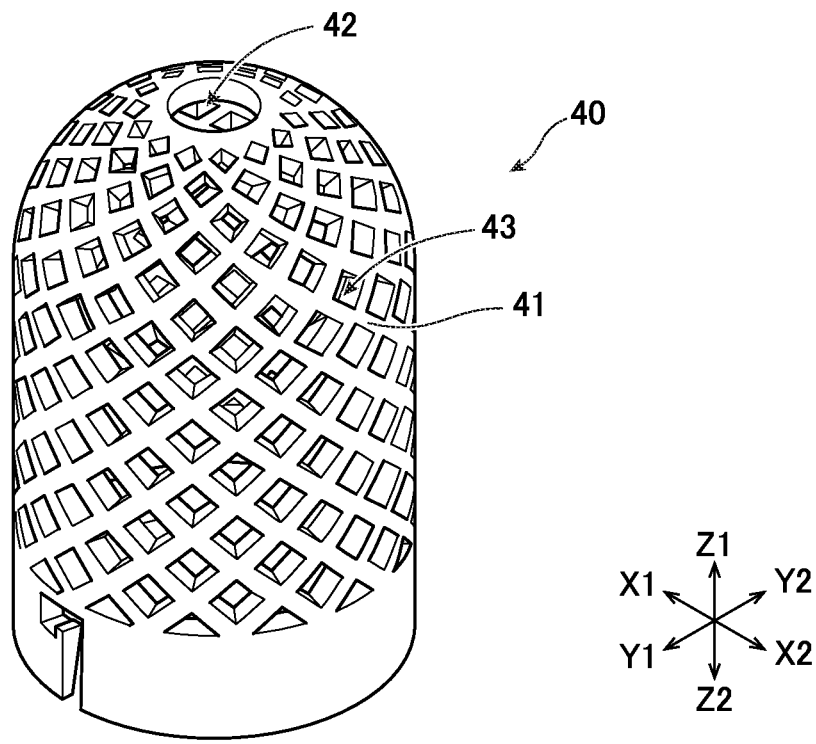
FIG. 9 is a perspective view illustrating a protective cover according to a second embodiment.

As illustrated in FIG. 9, a protective cover 40 applied to a sensor device of a second embodiment includes a plurality of support pillars 41 extending obliquely with respect to the height direction (Z1-Z2 direction) corresponding to the longitudinal direction of the sensor elements 3 and 4. In the protective cover 40, the support pillars 41 extend from the side portion to the upper portion. Though a hole 42 is formed at the top, the support pillars 41 may alternatively extend so as to cover this portion. In the protective cover 40, a plurality of through holes 43 are formed from the side portion to the upper portion, and the through holes 43 each have a substantially rhombic shape. The protective cover 40 illustrated in FIG. 9 is different from the protective cover 2 described in the first embodiment in manufacture thereof. That is, a cap having a substantially constant thickness with no holes formed therein is formed, and thereafter, the plurality of rhombic through holes 43 are formed by punching in the side portion of the cap. Further, the protective cover 40 of the second embodiment cannot be divided into a plurality of parts unlike that illustrated in FIG. 7, and is of a type that is fitted into the main body of the device from above.

Also in the second embodiment illustrated in FIG. 9, the plurality of support pillars 41 extend obliquely with respect to the height direction (Z1-Z2 direction) corresponding to the longitudinal direction of the sensor elements 3 and 4 and intersect in a lattice-like manner. Therefore, by applying the protective cover 40 of the second embodiment, it is possible to protect the sensor elements 3 and 4 from the outside and improve the omni-directionality to the surroundings at 360 degrees.

Also in this embodiment, it is preferable that the intersections where the plurality of support pillars 41 intersect, deviate from the center C (refer to FIGS. 2 and 3) of the first sensor element 3 in a side view at each of all angles to the circumferential direction.

Description of Sensor Device According to Third Embodiment

Figure 10:
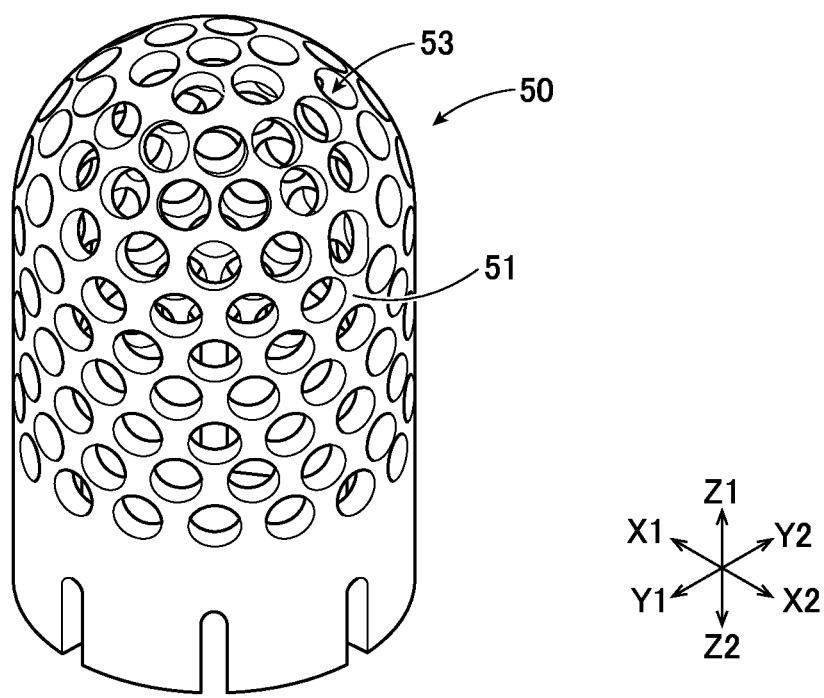
FIG. 10 is a perspective view illustrating a protective cover according to a third embodiment.

A protective cover 50 of the third embodiment illustrated in FIG. 10 is different from FIG. 9 in that through holes 53 each have a substantially circular shape, but have a structure similar to that in FIG. 9 in the other respects. Also the protective cover 50 illustrated in FIG. 10 has a mesh structure in which a plurality of support pillars 51 extend obliquely with respect to the height direction (Z1-Z2 direction) corresponding to the longitudinal direction of the sensor elements 3 and 4. Therefore, by applying the protective cover 50 of the third embodiment, it is possible to protect the sensor elements 3 and 4 from the outside and improve the omni-directionality to the surroundings at 360 degrees.

Also in this embodiment, it is preferable that the intersections where the plurality of support pillars 51 intersect, deviate from the center C (refer to FIGS. 2 and 3) of the first sensor element 3 in a side view at each of all angles to the circumferential direction.

Description of Sensor Device According to Fourth Embodiment

Figure 11:
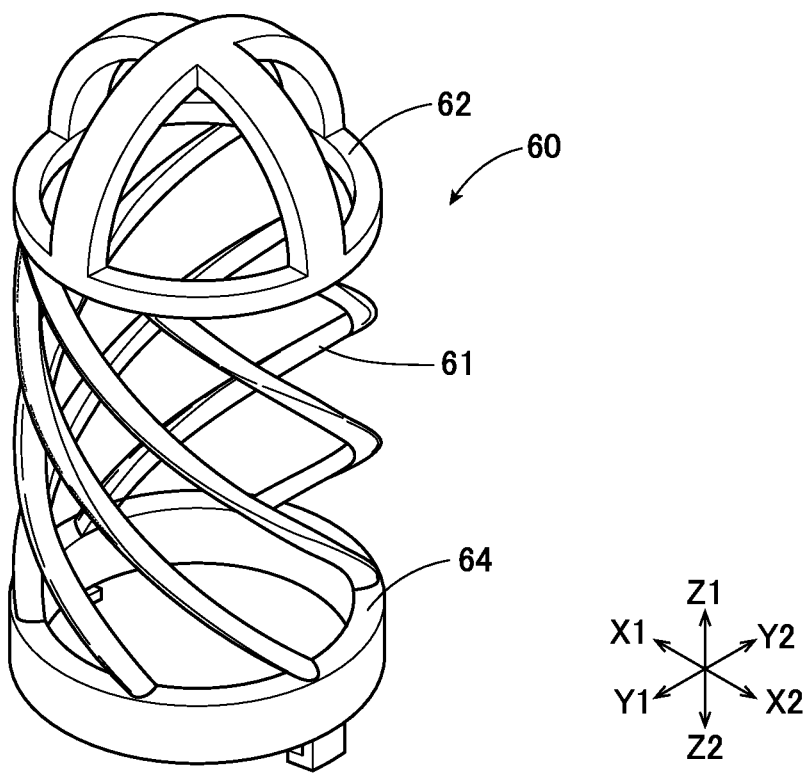
FIG. 11 is a perspective view illustrating a protective cover according to a fourth embodiment.

A protective cover 60 of a fourth embodiment illustrated in FIG. 11 is provided with a plurality of spiral support pillars 61 connecting a ring portion 62 in the upper end and a fixing support unit 64 in the lower end. These support pillars 61 extend obliquely with respect to the height direction (Z1-Z2 direction) corresponding to the longitudinal direction of the sensor elements 3 and 4. Therefore, by applying the protective cover 60 of the fourth embodiment, it is possible to protect the sensor elements 3 and 4 from the outside and improve the omni-directionality to the surroundings at 360 degrees. Additionally, with a view to increasing the strength of the protective cover 60, the mesh structure illustrated in FIGS. 1 to 3 is preferable.

Comparison with Comparative Examples

Figure 12:
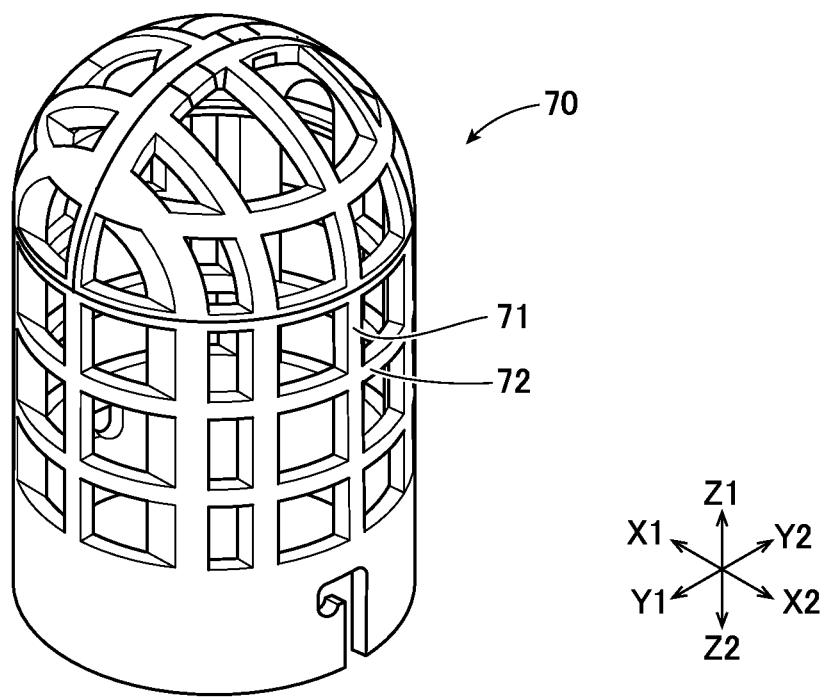
FIG. 12 is a perspective view illustrating a protective cover according to a first comparative example.
Figure 13:
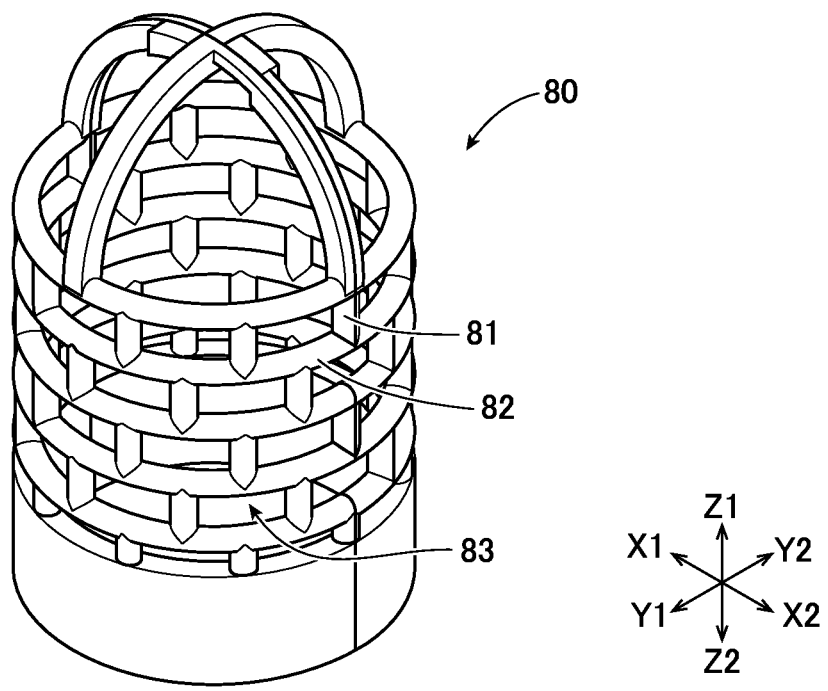
FIG. 13 is a perspective view illustrating a protective cover according to a second comparative example.

In contrast to the above-described embodiments, in protective covers 70 and 80 provided in sensor devices according to comparative examples illustrated in FIGS. 12 and 13, a plurality of support pillars 71 and 81 extend along the height direction (Z1-Z2 direction) corresponding to the longitudinal direction of the sensor elements 3 and 4. According to a first comparative example in FIG. 12, there is formed a structure in which a plurality of support pillars 71 and 72 intersect in a matrix pattern. Among the plurality of support pillars, the support pillar 71 extends along the height direction (Z1-Z2 direction). On the other hand, according to a second comparative example in FIG. 13, a plurality of support pillars 81 and 82 are placed such that through holes 83 are staggered. Among the plurality of support pillars, the support pillar 81 extends along the height direction (Z1-Z2 direction).

With the use of the sensor devices of the above-described embodiments and the sensor devices of the comparative examples, there were conducted experiments on flow sensing to wind that was caused to blow from the surroundings at 360 degrees. In the experiments, the same main body of device was used as a main body of device to which each protective cover was mounted. Additionally, experiments using the sensor device 1 according to the first to fourth embodiments will be described as "first to fourth examples".

The surroundings at 360 degrees are along a horizontal direction parallel to a plane including the X1-X2 direction and the Y1-Y2 direction illustrated in FIG. 1. The horizontal direction is a diameter direction of the first sensor element 3 standing upright along the Z1-Z2 direction.

In the experiments, wind was caused to blow against each sensor device from the surroundings at 360 degrees. For the wind speeds, the motion frequency of an inverter was controlled at four stages of 3 Hz, 7 Hz, 10 Hz, and 14 Hz. The higher the motion frequency, the higher the wind speed. The resultant wind speeds were measured by each sensor device.

Figure 14:
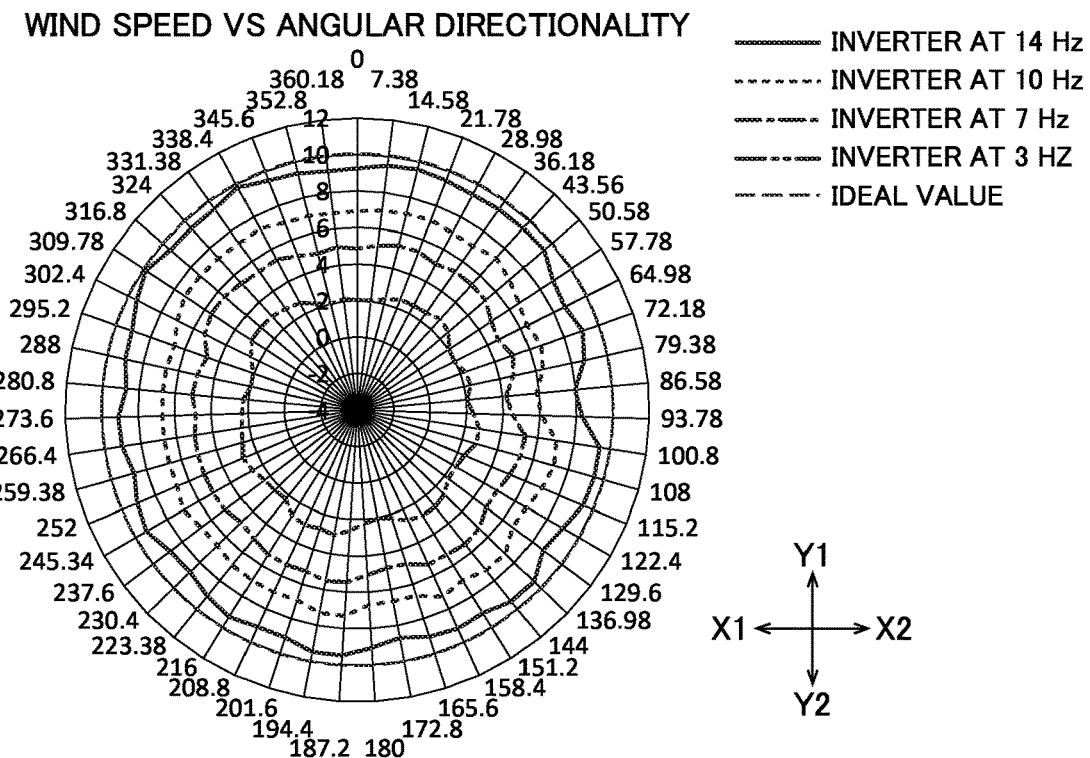
FIG. 14 illustrates results of an experiment conducted using a sensor device of a first example, that show a relationship between a wind speed and an angular directionality.

The experimental results of the first example are illustrated in FIG. 14. As illustrated in FIG. 14, numerical values on the outer edge of a circle graph plotted in imitation of a wind rose indicate directions of wind toward the sensor device 1 positioned at the center.

The numerical values "0, 2, 6, 8, 10, and 12" in the circle graph are the values of the wind speeds. Further, a plurality of bold-line curves in the circle graph indicate actual measurement values of wind speeds obtained when wind from the surroundings at 360 degrees was measured by the sensor device with the motion frequency of the inverter being adjusted to 3 Hz, 7 Hz, 10 Hz, and 14 Hz, respectively. FIG. 14 also illustrates ideal values as measurement values that might be ideally obtained with the motion frequency of the inverter being adjusted to 14 Hz.

Figure 15:
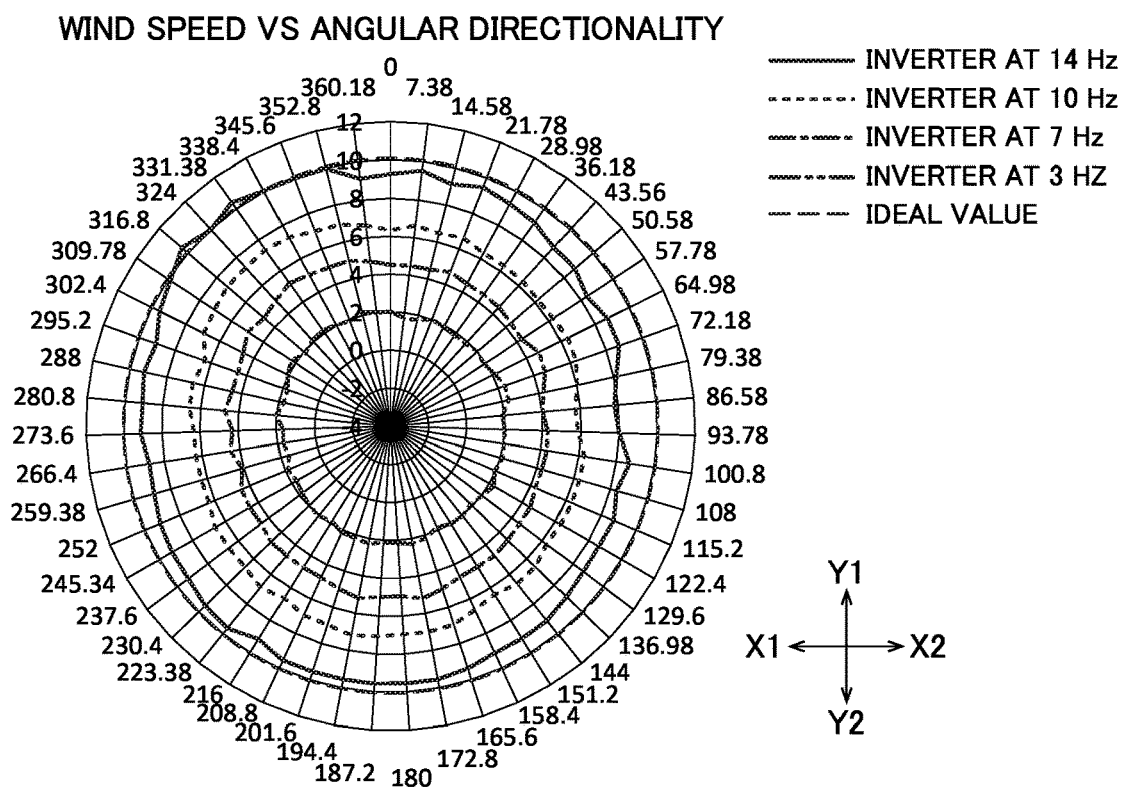
FIG. 15 illustrates results of an experiment conducted using a sensor device of a second example, that show a relationship between a wind speed and an angular directionality.
Figure 16:
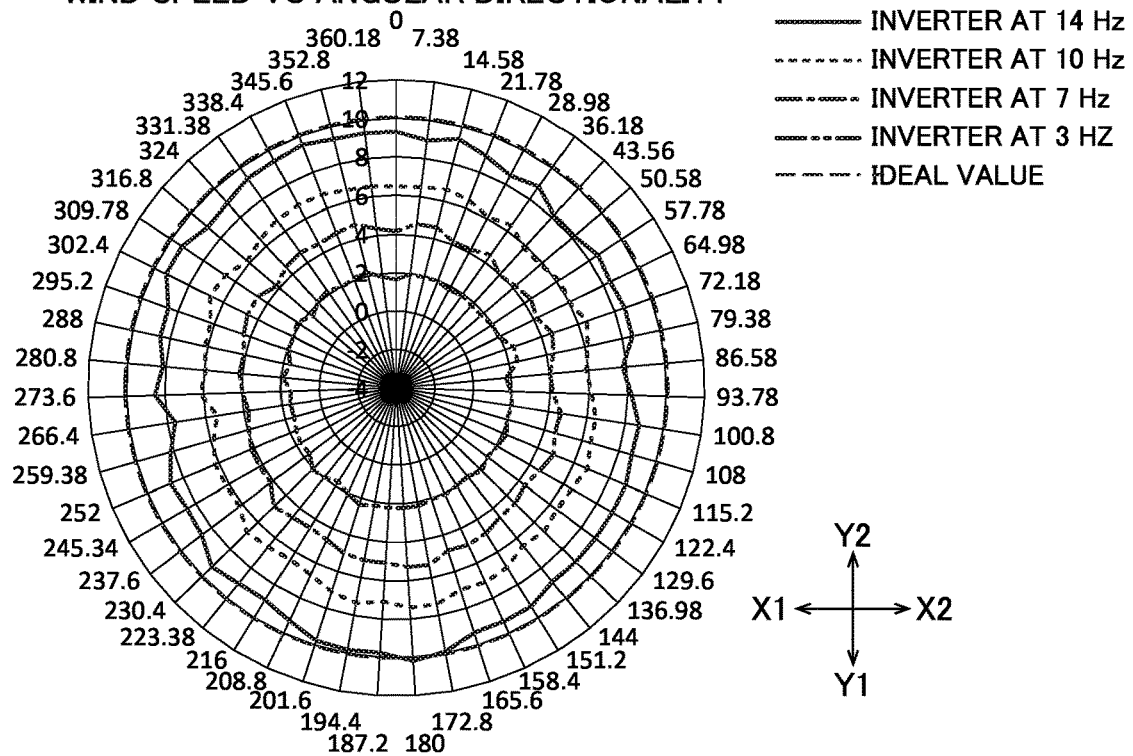
FIG. 16 illustrates results of an experiment conducted using a sensor device of a third example, that show a relationship between a wind speed and an angular directionality.
Figure 17:
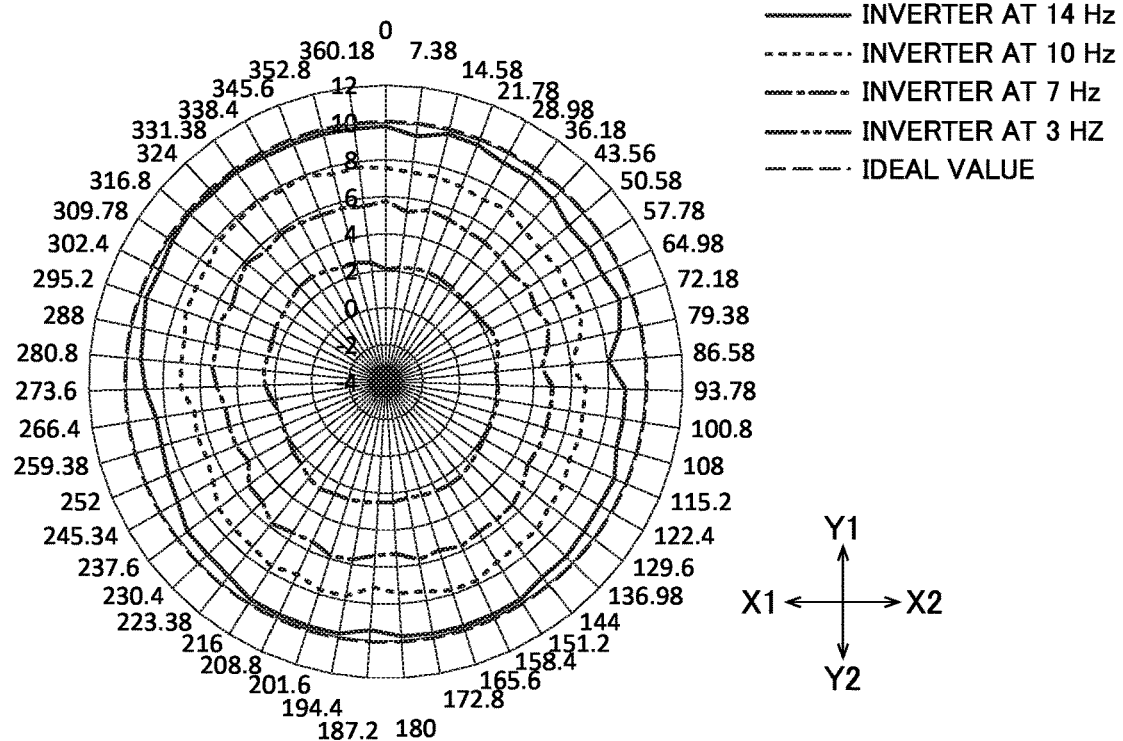
FIG. 17 illustrates results of an experiment conducted using a sensor device of a fourth example, that show a relationship between a wind speed and an angular directionality.

In the second to fourth examples and the first and second comparative examples, the speeds of wind blowing from the surroundings at 360 degrees were measured in the same manner as described above. The experimental results of the second example are illustrated in FIG. 15, the experimental results of the third example are illustrated in FIG. 16, the experimental results of the fourth example are illustrated in FIG. 17, the experimental results of the first comparative example are illustrated in FIG. 18, and the experimental results of the second comparative example are illustrated in FIG. 19.

Figure 18:
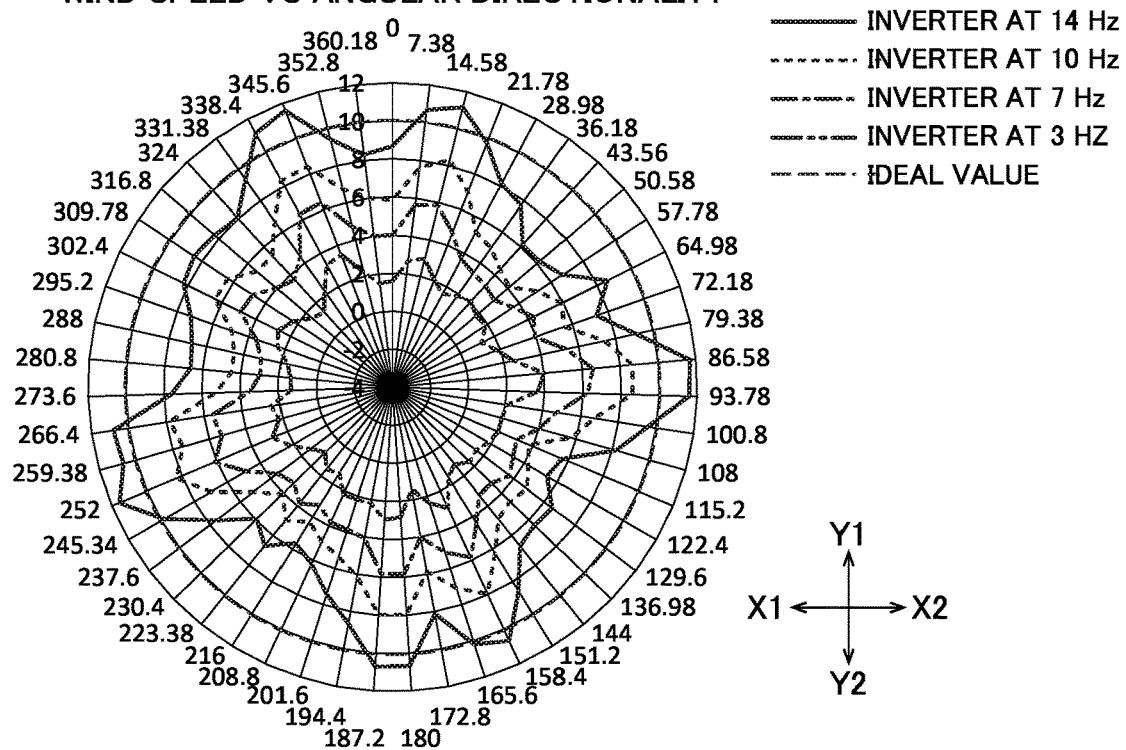
FIG. 18 illustrates results of an experiment conducted using a sensor device of a first comparative example, that show a relationship between a wind speed and an angular directionality.

As illustrated in FIG. 18, in the first comparative example, it has been found that the sensing accuracy is extremely lowered in sensing the volume of air blowing from approximately 30 to 70 degree directions, approximately 115 to 140 degree directions, approximately 200 to 240 degree directions, and approximately 270 to 320 degree directions.

Figure 19:
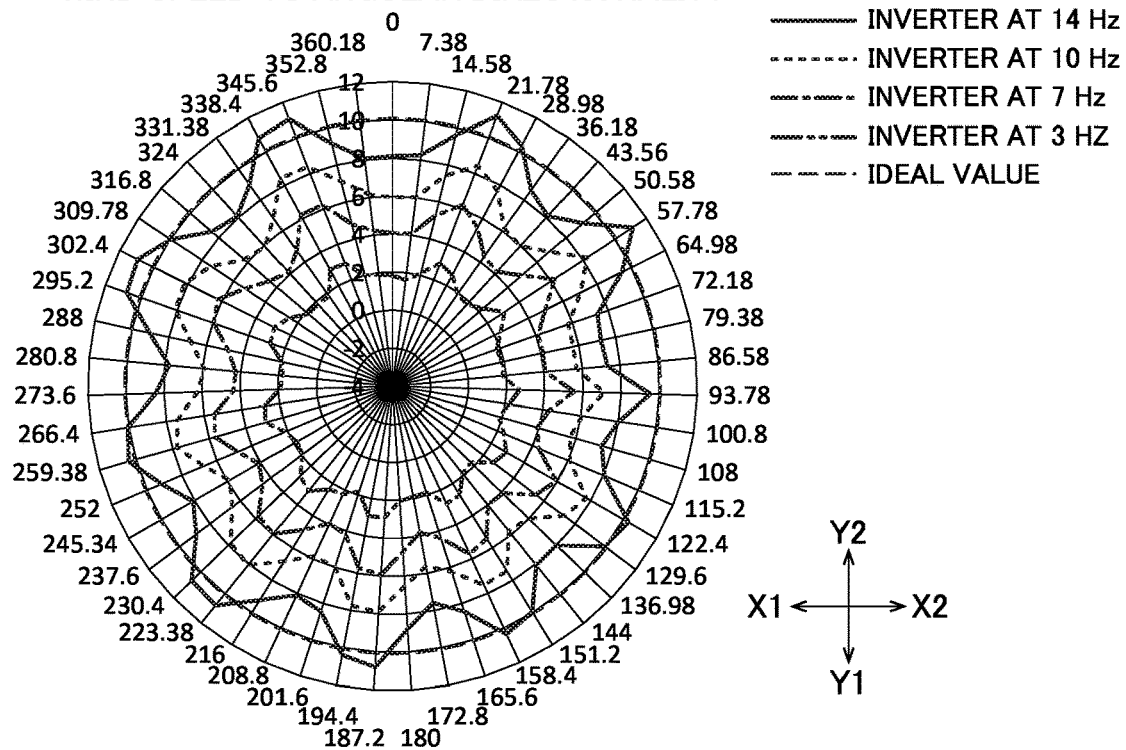
FIG. 19 illustrates results of an experiment conducted using a sensor device of a second comparative example, that show a relationship between a wind speed and an angular directionality.

Further, as illustrated in FIG. 19, in the second comparative example, it has been found that the sensing accuracy was extremely lowered in sensing the volume of air blowing from approximately 30 to 50 degree directions, approximately 60 to 90 degree directions, approximately 100 to 120 degree directions, approximately 130 to 150 degree directions, approximately 160 to 180 degree directions, approximately 200 to 220 degree directions, approximately 230 to 250 degree directions, approximately 270 to 290 degree directions, approximately 310 to 340 degree directions, and approximately 350 to 10 degree directions.

In the first and second comparative examples, the reason why the accuracy in sensing the volume of air blowing from the directions at the degrees in the above-described ranges is lowered is considered to lie in that the height direction (Z1-Z2 direction) corresponding to the longitudinal direction of the first sensor element 3 substantially coincides with the support pillars in a side view at each of the angles in the above-described ranges, and thus the wind does not properly reach the first sensor element.

In contrast thereto, in the first to fourth examples, as illustrated in FIGS. 14 to 17, extreme lowering of the sensing accuracy was not observed in sensing the volume of air blowing from directions at any angles, and it has been found that the sensing accuracy was closer to the ideal value than that in the first and second comparative examples.

In the first to fourth examples, the plurality of support pillars surrounding the peripheries of the sensor elements 3 and 4 extend obliquely with respect to the height direction (Z1-Z2 direction) corresponding to the longitudinal direction of the sensor elements. For this reason, the support pillars and the longitudinal direction of the first sensor element 3 do not overlap each other in a side view at any angle. Therefore, wind can be caused to properly act on the first sensor element 3 from the surroundings at all angles to the circumferential direction, whereby the omni-directionality to the surroundings at 360 degrees can be improved.

Among the first to fourth examples, in the third example illustrated in FIG. 16, the accuracy of sensing the volume of air blowing from approximately 0 to 80 degree directions and approximately 230 to 350 degree directions was slightly lowered as compared to that in the first, second, and fourth examples. Further, among the first and second examples in which the plurality of support pillars intersect in a lattice-like manner, the first example was superior to the second example in the accuracy of sensing the volume of air blowing from approximately 190 to 150 degree directions. This has revealed that the first example was excellent in the strength of the protective cover and the omni-directionality to the surroundings at 360 degrees. Additionally, the first example satisfies all the conditions (1) to (4) described above.

Other Embodiments

In another embodiment, the present invention is also applicable to a configuration other than a configuration in which the first sensor element 3 including a flow sensing resistor extends long along one direction. However, the first sensor element 3 is required to include a flow sensing resistor that is formed along the entire circumferential direction of the sensor element. For example, a spherical sensor element can be proposed as the first sensor element. Specifically, in a structure in which a flow sensing resistor is formed over the entire surface of a spherical base, the flow sensing resistor is formed along the entire circumferential direction of the sensor element.

The spherical first sensor element is connected to the substrate 9 via the lead wires 6a and 6b illustrated in FIG. 8 and the like. Then, the protective cover 2 (that refers to the protective cover 2 illustrated in FIG. 1 and the like in this description, as a representative example) surrounds the peripheries of the sensor elements 3 and 4 with the plurality of support pillars 13 extending obliquely with respect to a direction in which the sensor elements 3 and 4 are placed as viewed from the substrate 9, that is, the height direction (Z1-Z2 direction). As a result of this, the sensor elements 3 and 4 can be appropriately protected from the outside and the omni-directionality to the surroundings at 360 degrees can be improved. At that time, it is preferable that the first sensor element 3 is placed in a position higher than the second sensor element 4. As a protective cover, any of the structures in the above-described first to fourth embodiments can be applied.

Though the sensor device 1 has been described above as a wind sensor, a fluid being sensed may be gas or liquid other than wind.

Therefore, according to the present invention, the sensor element can be appropriately protected from the outside and the omni-directionality to the surroundings at 360 degrees can be improved. Thus, the present invention can be put to various applications. For example, the present invention can be applied to air conditioning equipment, a wind control system, analysis, and the like.

What is claimed is:

1. A sensor device comprising:
    a sensor element, which measures wind speed, including a temperature-sensitive resistor; and
    a protective cover that protects the sensor element,
    wherein the sensor element has a shape extending long along one direction,
    wherein the temperature-sensitive resistor is formed along an entire circumferential direction about a centerline extending in the one direction, and
    wherein the protective cover surrounds a periphery of the sensor element with a plurality of support pillars extending obliquely with respect to a longitudinal direction of the sensor element, allowing omni-directional wind speed detection in the circumferential direction.

2. The sensor device according to claim 1, wherein the plurality of support pillars intersect in a lattice-like manner.

3. The sensor device according to claim 2, wherein intersections where the plurality of support pillars intersect, deviate from a center of the sensor element in a side view at each of all angles to a circumferential direction.

4. The sensor device according to claim 1, wherein a width of each of the support pillars is smaller than a longitudinal length of the sensor element.

5. The sensor device according to claim 1, wherein a length from an outside to an inside of each of the support pillars is larger than a width of each of the support pillars.

6. The sensor device according to claim 1, wherein each of the support pillars is formed so as to have a protrusion-shaped section in which a width gradually decreases from an inside to an outside.

7. The sensor device according to claim 1, wherein the protective cover includes a storage unit in which a substrate supporting the sensor element is stored, in a lower end of the support pillars.

8. A sensor device comprising:
    a sensor element, which measures wind speed, including a temperature-sensitive resistor; and
    a protective cover that protects the sensor element,
    wherein the sensor element is supported by a substrate,
    wherein the temperature-sensitive resistor is formed along an entire circumferential direction of the sensor element, and
    wherein the protective cover surrounds a periphery of the sensor element with a plurality of support pillars extending obliquely with respect to a direction in which the sensor element is placed as viewed from the substrate, allowing omni-directional wind speed detection in the circumferential direction.

* * * * *